US012176986B2

United States Patent
Karjalainen et al.

(10) Patent No.: US 12,176,986 B2
(45) Date of Patent: Dec. 24, 2024

(54) APPARATUS, METHOD AND COMPUTER PROGRAM FOR BEAM MANAGEMENT

(71) Applicant: NOKIA TECHNOLOGIES OY, Espoo (FI)

(72) Inventors: Juha Pekka Karjalainen, Oulu (FI); Jari Yrjänä Hulkkonen, Oulu (FI)

(*) Notice: Subject to any disclaimer, the term of this patent is extended or adjusted under 35 U.S.C. 154(b) by 651 days.

(21) Appl. No.: 17/429,455

(22) PCT Filed: Feb. 15, 2019

(86) PCT No.: PCT/EP2019/053882
§ 371 (c)(1),
(2) Date: Aug. 9, 2021

(87) PCT Pub. No.: WO2020/164743
PCT Pub. Date: Aug. 20, 2020

(65) Prior Publication Data
US 2022/0123817 A1    Apr. 21, 2022

(51) Int. Cl.
| H04B 7/06 | (2006.01) |
| G01S 5/00 | (2006.01) |
| G01S 5/02 | (2010.01) |
| H04W 24/10 | (2009.01) |
| H04W 72/23 | (2023.01) |

(52) U.S. Cl.
CPC .......... *H04B 7/0695* (2013.01); *G01S 5/0045* (2013.01); *G01S 5/0226* (2013.01); *H04W 24/10* (2013.01); *H04W 72/23* (2023.01)

(58) Field of Classification Search
CPC ..... H04B 7/0695; H04B 7/063; G01S 5/0045; G01S 5/0226; G01S 5/0236; G01S 5/08; G01S 5/12; H04W 24/10; H04W 72/23
See application file for complete search history.

(56) References Cited

U.S. PATENT DOCUMENTS

| 8,050,686 B1 * | 11/2011 | Souissi | G01S 5/12 |
| | | | 455/67.11 |
| 2013/0064129 A1 * | 3/2013 | Koivisto | H04B 7/065 |
| | | | 370/252 |
| 2013/0235742 A1 * | 9/2013 | Josiam | H04L 5/0057 |
| | | | 370/252 |
| 2018/0191418 A1 * | 7/2018 | Xia | H04B 7/088 |

(Continued)

FOREIGN PATENT DOCUMENTS

| WO | WO 2018/172823 A1 | 9/2018 |
| WO | WO 2018/183991 A1 | 10/2018 |

OTHER PUBLICATIONS

International Search Report and Written Opinion dated Sep. 12, 2019 corresponding to International Patent Application No. PCT/EP2019/053882.

(Continued)

*Primary Examiner* — Charles N Appiah
*Assistant Examiner* — Frank E Donado
(74) *Attorney, Agent, or Firm* — Lippes Mathias LLP

(57) ABSTRACT

There is provided an apparatus, said apparatus comprising means for receiving an indication from a base station, at a user equipment having at least one antenna panel, to provide beam reporting information according to one of a plurality of beam reporting formats and providing beam reporting information to the base station according to the indicated beam reporting format.

14 Claims, 8 Drawing Sheets

(56) References Cited

U.S. PATENT DOCUMENTS

| | | | |
|---|---|---|---|
| 2018/0219717 A1* | 8/2018 | Lee | H04W 56/0015 |
| 2019/0053013 A1 | 2/2019 | Markhovsky et al. | |
| 2019/0245605 A1* | 8/2019 | Islam | H04W 72/54 |
| 2019/0260458 A1* | 8/2019 | Zhou | H04W 72/046 |
| 2020/0059799 A1* | 2/2020 | Suzuki | H04B 7/0628 |
| 2020/0220606 A1* | 7/2020 | Zhang | H04W 72/046 |
| 2021/0242919 A1* | 8/2021 | Park | H04B 7/0617 |
| 2021/0258811 A1* | 8/2021 | Zhang | H04B 7/0691 |
| 2021/0281294 A1* | 9/2021 | Takano | H04W 16/28 |
| 2022/0099785 A1* | 3/2022 | Priyanto | G01S 5/08 |
| 2023/0239718 A1* | 7/2023 | Gao | H04W 72/046 |
| | | | 370/329 |

OTHER PUBLICATIONS

3GPP TR 38.855 V1.0.0 (Dec. 2018), Technical Report, 3rd Generation Partnership Project; Technical Specification Group Radio Access Network; Study on NR positioning support (Release 16), Dec. 2018.

3GPP TS 38.215 V15.4.0 (Dec. 2018), Technical Specification, 3rd Generation Partnership Project; Technical Specification Group Radio Access Network; NR; Physical layer measurements (Release 15), Dec. 2018.

Communication pursuant to Article 94(3) EPC dated Sep. 21, 2023, corresponding to European Patent Application No. 19706510.5.

\* cited by examiner

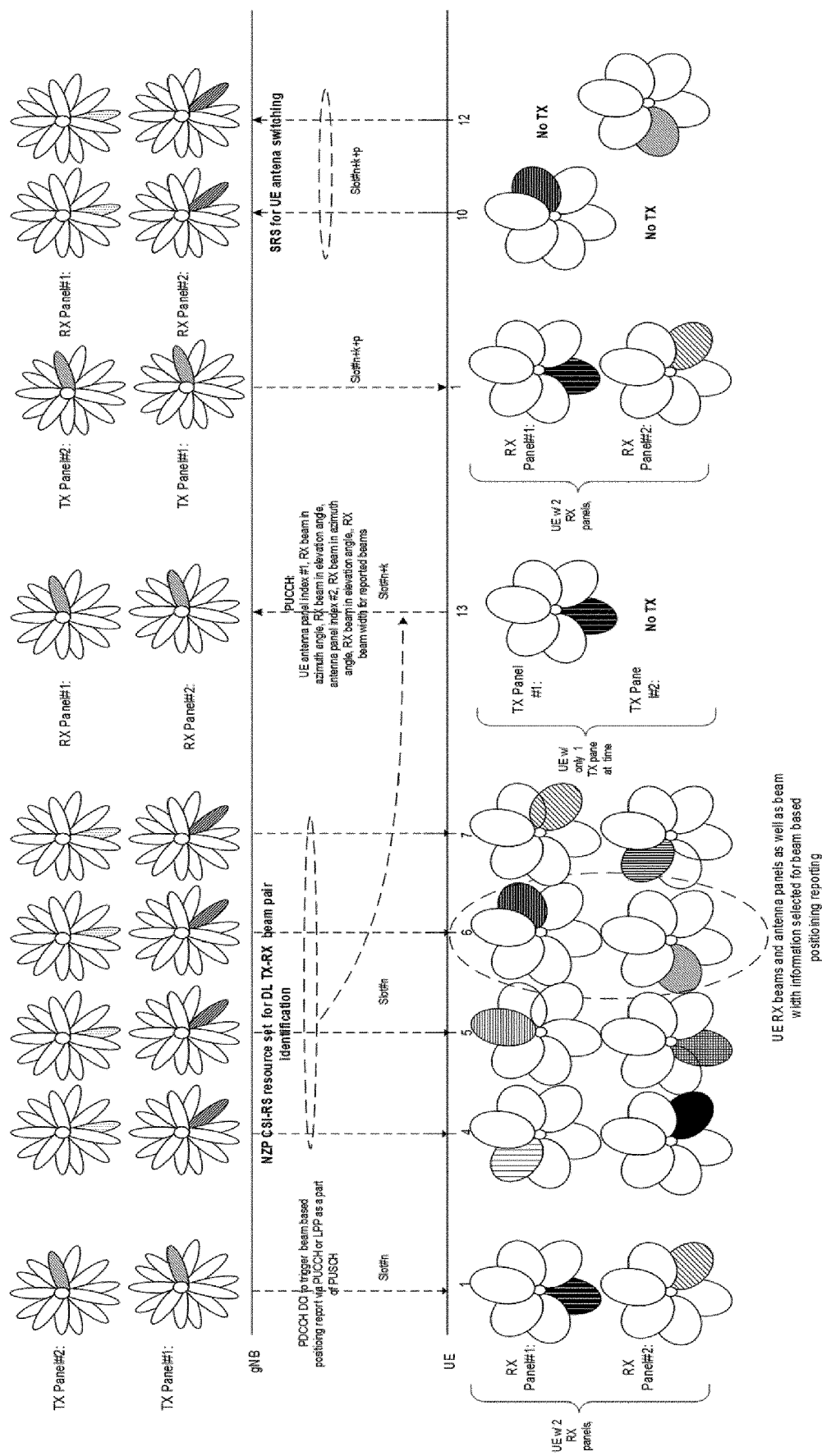

APPARATUS, METHOD AND COMPUTER PROGRAM FOR BEAM MANAGEMENT

FIELD

The present application relates to a method, apparatus, system and computer program and in particular but not exclusively to a multi-stage signalling mechanism for beam based positioning.

BACKGROUND

A communication system can be seen as a facility that enables communication sessions between two or more entities such as user terminals, base stations and/or other nodes by providing carriers between the various entities involved in the communications path. A communication system can be provided for example by means of a communication network and one or more compatible communication devices (also referred to as station or user equipment) and/or application servers. The communication sessions may comprise, for example, communication of data for carrying communications such as voice, video, electronic mail (email), text message, multimedia, content data, time-sensitive network (TSN) flows and/or data in an industrial application such as critical system messages between an actuator and a controller, critical sensor data (such as measurements, video feed etc.) towards a control system and so on. Non-limiting examples of services provided comprise two-way or multi-way calls, data communication or multimedia services and access to a data network system, such as the Internet.

In a wireless communication system at least a part of a communication session, for example, between at least two stations or between at least one station and at least one application server (e.g. for video), occurs over a wireless link. Examples of wireless systems comprise public land mobile networks (PLMN) operating based on 3GPP radio standards such as E-UTRA, New Radio, satellite based communication systems and different wireless local networks, for example wireless local area networks (WLAN). The wireless systems can typically be divided into cells, and are therefore often referred to as cellular systems.

A user can access the communication system by means of an appropriate communication device or terminal. A communication device of a user may be referred to as user equipment (UE) or user device. A communication device is provided with an appropriate signal receiving and transmitting apparatus for enabling communications, for example enabling access to a communication network or communications directly with other users. The communication device may access one or more carriers provided by the network, for example a base station of a cell, and transmit and/or receive communications on the one or more carriers.

The communication system and associated devices typically operate in accordance with a given standard or specification which sets out what the various entities associated with the system are permitted to do and how that should be achieved. Communication protocols and/or parameters which shall be used for the connection are also typically defined. One example of a communications system is UTRAN (3G radio). Other examples of communication systems are the long-term evolution (LTE) of the Universal Mobile Telecommunications System (UMTS) based on the E-UTRAN radio-access technology, and so-called 5G system (5GS) including the 5G or next generation core (NGC) and the 5G Access network based on the New Radio (NR) radio-access technology. 5GS including NR are being standardized by the 3rd Generation Partnership Project (3GPP).

SUMMARY

In a first aspect there is provided an apparatus, said apparatus comprising means for receiving an indication from a base station, at a user equipment having at least one antenna panel, to provide beam reporting information according to one of a plurality of beam reporting formats and providing beam reporting information to the base station according to the indicated beam reporting format.

The apparatus may comprise means for providing the beam reporting information periodically or semi-persistently or aperiodically.

The beam reporting information may be for use in determining at least one of user equipment positioning and user equipment orientation.

The beam reporting format may comprise at least one of a coarse-level, full-level and differential-level reporting format.

The beam reporting information may comprise an indication of the antenna panels used for beam measurement.

The beam reporting information may comprise an indication of at least one received beam direction per antenna panel.

The indication of received beam direction may comprise a differential value per antenna panel.

One of the at least one antenna panels may be a reference antenna panel. Said differential value may be provided with respect to an indication of received beam direction for the reference antenna panel.

The beam reporting information may comprise an indication of received beam width.

The beam reporting information may comprise time delay information.

The time delay information may comprise a differential value.

One of the at least one antenna panels may be a reference antenna panel. Said differential value may be provided with respect to time delay information for the reference antenna panel.

The indicated beam format may be determined based on a position accuracy requirement.

Position accuracy may be based on parameters which affect positioning accuracy.

The apparatus may comprise means for receiving the indication from the base station in downlink control information associated with a physical downlink control channel, a medium access control, MAC, control element or radio resource control signalling.

The apparatus may comprise means for providing the beam reporting information using a physical uplink control channel or a physical uplink shared channel.

The apparatus may comprise means for receiving an indication to activate or deactivate one or more of the at least one antenna panels.

The apparatus may comprise means for receiving the indication to activate or deactivate one or more of the at least one antenna panels in downlink control information associated with a physical downlink control channel, a medium access control, MAC, control element or radio resource control signalling.

In a second aspect, there is provided an apparatus comprising means for providing an indication to a user equipment having at least one antenna panel to provide beam reporting information according to one of a plurality of beam reporting formats and receiving beam reporting information from the user equipment according to the indicated beam reporting format.

The apparatus may comprise means for providing an indication to the user equipment to activate or deactivate one or more of the at least one antenna panels.

The apparatus may comprise means for providing the indication to provide beam reporting information according to one of a plurality of beam reporting formats or the indication to activate or deactivate one or more of the at least one antenna panels to the user equipment in downlink control information associated with a physical downlink control channel, a medium access control, MAC, control element or radio resource control signalling.

The apparatus may comprise means for receiving the beam reporting information periodically or semi-persistently or aperiodically.

The beam reporting information may be for use in determining at least one of user equipment positioning and user equipment orientation.

The beam reporting format may comprise at least one of a coarse-level, full-level and differential-level reporting format.

The beam reporting information may comprise an indication of the antenna panels used for beam measurement.

The beam reporting information may comprise an indication of at least one received beam direction per antenna panel.

The indication of received beam direction may comprise a differential value per antenna panel.

One of the at least one antenna panels may be a reference antenna panel. Said differential value may be provided with respect to an indication of received beam direction for the reference antenna panel.

The beam reporting information may comprise an indication of received beam width.

The beam reporting information may comprise time delay information.

The time delay information may comprise a differential value.

One of the at least one antenna panels may be a reference antenna panel. Said differential value may be provided with respect to time delay information for the reference antenna panel.

The indicated beam format may be determined based on a position accuracy requirement.

Position accuracy may be based on parameters which affect positioning accuracy.

The apparatus may comprise means for receiving the beam reporting information using a physical uplink control channel or a physical uplink shared channel.

In a third aspect there is provided a method comprising receiving an indication from a base station, at a user equipment having at least one antenna panel, to provide beam reporting information according to one of a plurality of beam reporting formats and providing beam reporting information to the base station according to the indicated beam reporting format.

The method may comprise providing the beam reporting information periodically or semi-persistently or aperiodically.

The beam reporting information may be for use in determining at least one of user equipment positioning and user equipment orientation.

The beam reporting format may comprise at least one of a coarse-level, full-level and differential-level reporting format.

The beam reporting information may comprise an indication of the antenna panels used for beam measurement.

The beam reporting information may comprise an indication of at least one received beam direction per antenna panel.

The indication of received beam direction may comprise a differential value per antenna panel.

One of the at least one antenna panels may be a reference antenna panel. Said differential value may be provided with respect to an indication of received beam direction for the reference antenna panel.

The beam reporting information may comprise an indication of received beam width.

The beam reporting information may comprise time delay information.

The time delay information may comprise a differential value.

One of the at least one antenna panels may be a reference antenna panel. Said differential value may be provided with respect to time delay information for the reference antenna panel.

The indicated beam format may be determined based on a position accuracy requirement.

Position accuracy may be based on parameters which affect positioning accuracy.

The method may comprise receiving the indication from the base station in downlink control information associated with a physical downlink control channel, a medium access control, MAC, control element or radio resource control signalling.

The method may comprise providing the beam reporting information using a physical uplink control channel or a physical uplink shared channel.

The method may comprise receiving an indication to activate or deactivate one or more of the at least one antenna panels.

The method may comprise receiving the indication to activate or deactivate one or more of the at least one antenna panels in downlink control information associated with a physical downlink control channel, a medium access control, MAC, control element or radio resource control signalling.

In a fourth aspect there is provided a method comprising providing an indication to a user equipment having at least one antenna panel to provide beam reporting information according to one of a plurality of beam reporting formats and receiving beam reporting information from the user equipment according to the indicated beam reporting format.

The method may comprise providing an indication to the user equipment to activate or deactivate one or more of the at least one antenna panels.

The method may comprise providing the indication to provide beam reporting information according to one of a plurality of beam reporting formats or the indication to activate or deactivate one or more of the at least one antenna panels to the user equipment in downlink control information associated with a physical downlink control channel, a medium access control, MAC, control element or radio resource control signalling.

The method may comprise receiving the beam reporting information periodically or semi-persistently or aperiodically.

The beam reporting information may be for use in determining at least one of user equipment positioning and user equipment orientation.

The beam reporting format may comprise at least one of a coarse-level, full-level and differential-level reporting format.

The beam reporting information may comprise an indication of the antenna panels used for beam measurement.

The beam reporting information may comprise an indication of at least one received beam direction per antenna panel.

The indication of received beam direction may comprise a differential value per antenna panel.

One of the at least one antenna panels may be a reference antenna panel. Said differential value may be provided with respect to an indication of received beam direction for the reference antenna panel.

The beam reporting information may comprise an indication of received beam width.

The beam reporting information may comprise time delay information.

The time delay information may comprise a differential value.

One of the at least one antenna panels may be a reference antenna panel. Said differential value may be provided with respect to time delay information for the reference antenna panel.

The indicated beam format may be determined based on a position accuracy requirement.

Position accuracy may be based on parameters which affect positioning accuracy.

The method may comprise receiving the beam reporting information using a physical uplink control channel or a physical uplink shared channel.

In a fifth aspect there is provided an apparatus comprising: at least one processor and at least one memory including a computer program code, the at least one memory and computer program code configured to, with the at least one processor, cause the apparatus at least to: receive an indication from a base station, at a user equipment having at least one antenna panel, to provide beam reporting information according to one of a plurality of beam reporting formats and provide beam reporting information to the base station according to the indicated beam reporting format.

The apparatus may be configured to provide the beam reporting information periodically or semi-persistently or aperiodically.

The beam reporting information may be for use in determining at least one of user equipment positioning and user equipment orientation.

The beam reporting format may comprise at least one of a coarse-level, full-level and differential-level reporting format.

The beam reporting information may comprise an indication of the antenna panels used for beam measurement.

The beam reporting information may comprise an indication of at least one received beam direction per antenna panel.

The indication of received beam direction may comprise a differential value per antenna panel.

One of the at least one antenna panels may be a reference antenna panel. Said differential value may be provided with respect to an indication of received beam direction for the reference antenna panel.

The beam reporting information may comprise an indication of received beam width.

The beam reporting information may comprise time delay information.

The time delay information may comprise a differential value.

One of the at least one antenna panels may be a reference antenna panel. Said differential value may be provided with respect to time delay information for the reference antenna panel.

The indicated beam format may be determined based on a position accuracy requirement.

Position accuracy may be based on parameters which affect positioning accuracy.

The apparatus may be configured to receive the indication from the base station in downlink control information associated with a physical downlink control channel, a medium access control, MAC, control element or radio resource control signalling.

The apparatus may be configured to provide the beam reporting information using a physical uplink control channel or a physical uplink shared channel.

The apparatus may be configured to receive an indication to activate or deactivate one or more of the at least one antenna panels.

The apparatus may be configured to receive the indication to activate or deactivate one or more of the at least one antenna panels in downlink control information associated with a physical downlink control channel, a medium access control, MAC, control element or radio resource control signalling.

In a sixth aspect, there is provided an apparatus comprising: at least one processor and at least one memory including a computer program code, the at least one memory and computer program code configured to, with the at least one processor, cause the apparatus at least to:

provide an indication to a user equipment having at least one antenna panel, to provide beam reporting information according to one of a plurality of beam reporting formats and receive beam reporting information from the user equipment according to the indicated beam reporting format.

The apparatus may be configured to provide an indication to the user equipment to activate or deactivate one or more of the at least one antenna panels.

The apparatus may be configured to provide the indication to provide beam reporting information according to one of a plurality of beam reporting formats or the indication to activate or deactivate one or more of the at least one antenna panels to the user equipment in downlink control information associated with a physical downlink control channel, a medium access control, MAC, control element or radio resource control signalling.

The apparatus may be configured to receive the beam reporting information periodically or semi-persistently or aperiodically.

The beam reporting information may be for use in determining at least one of user equipment positioning and user equipment orientation.

The beam reporting format may comprise at least one of a coarse-level, full-level and differential-level reporting format.

The beam reporting information may comprise an indication of the antenna panels used for beam measurement.

The beam reporting information may comprise an indication of at least one received beam direction per antenna panel.

The indication of received beam direction may comprise a differential value per antenna panel.

One of the at least one antenna panels may be a reference antenna panel. Said differential value may be provided with respect to an indication of received beam direction for the reference antenna panel.

The beam reporting information may comprise an indication of received beam width.

The beam reporting information may comprise time delay information.

The time delay information may comprise a differential value.

One of the at least one antenna panels may be a reference antenna panel. Said differential value may be provided with respect to time delay information for the reference antenna panel.

The indicated beam format may be determined based on a position accuracy requirement.

Position accuracy may be based on parameters which affect positioning accuracy.

The apparatus may be configured to receive the beam reporting information using a physical uplink control channel or a physical uplink shared channel.

In a seventh aspect there is provided a computer readable medium comprising program instructions for causing an apparatus to perform at least the following receiving an indication from a base station, at a user equipment having at least one antenna panel, to provide beam reporting information according to one of a plurality of beam reporting formats and providing beam reporting information to the base station according to the indicated beam reporting format.

The apparatus may be caused to perform providing the beam reporting information periodically or semi-persistently or aperiodically.

The beam reporting information may be for use in determining at least one of user equipment positioning and user equipment orientation.

The beam reporting format may comprise at least one of a coarse-level, full-level and differential-level reporting format.

The beam reporting information may comprise an indication of the antenna panels used for beam measurement.

The beam reporting information may comprise an indication of at least one received beam direction per antenna panel.

The indication of received beam direction may comprise a differential value per antenna panel.

One of the at least one antenna panels may be a reference antenna panel. Said differential value may be provided with respect to an indication of received beam direction for the reference antenna panel.

The beam reporting information may comprise an indication of received beam width.

The beam reporting information may comprise time delay information.

The time delay information may comprise a differential value.

One of the at least one antenna panels may be a reference antenna panel. Said differential value may be provided with respect to time delay information for the reference antenna panel.

The indicated beam format may be determined based on a position accuracy requirement.

Position accuracy may be based on parameters which affect positioning accuracy.

The apparatus may be caused to perform receiving the indication from the base station in downlink control information associated with a physical downlink control channel, a medium access control, MAC, control element or radio resource control signalling.

The apparatus may be caused to perform providing the beam reporting information using a physical uplink control channel or a physical uplink shared channel.

The apparatus may be caused to perform receiving an indication to activate or deactivate one or more of the at least one antenna panels.

The apparatus may be caused to perform receiving the indication to activate or deactivate one or more of the at least one antenna panels in downlink control information associated with a physical downlink control channel, a medium access control, MAC, control element or radio resource control signalling.

In an eighth aspect, there is provided a computer readable medium comprising program instructions for causing an apparatus to perform at least the following providing an indication to a user equipment having at least one antenna panel, to provide beam reporting information according to one of a plurality of beam reporting formats and receiving beam reporting information from the user equipment according to the indicated beam reporting format.

The apparatus may comprise means for providing an indication to the user equipment to activate or deactivate one or more of the at least one antenna panels.

The apparatus may be caused to perform providing the indication to provide beam reporting information according to one of a plurality of beam reporting formats or the indication to activate or deactivate one or more of the at least one antenna panels to the user equipment in downlink control information associated with a physical downlink control channel, a medium access control, MAC, control element or radio resource control signalling.

The apparatus may be caused to perform receiving the beam reporting information periodically or semi-persistently or aperiodically.

The beam reporting information may be for use in determining at least one of user equipment positioning and user equipment orientation.

The beam reporting format may comprise at least one of a coarse-level, full-level and differential-level reporting format.

The beam reporting information may comprise an indication of the antenna panels used for beam measurement.

The beam reporting information may comprise an indication of at least one received beam direction per antenna panel.

The indication of received beam direction may comprise a differential value per antenna panel.

One of the at least one antenna panels may be a reference antenna panel. Said differential value may be provided with respect to an indication of received beam direction for the reference antenna panel.

The beam reporting information may comprise an indication of received beam width.

The beam reporting information may comprise time delay information.

The time delay information may comprise a differential value.

One of the at least one antenna panels may be a reference antenna panel. Said differential value may be provided with respect to time delay information for the reference antenna panel.

The indicated beam format may be determined based on a position accuracy requirement.

Position accuracy may be based on parameters which affect positioning accuracy.

The apparatus may be caused to perform receiving the beam reporting information using a physical uplink control channel or a physical uplink shared channel.

In a ninth aspect there is provided a non-transitory computer readable medium comprising program instructions for causing an apparatus to perform at least the method according to the third or fourth aspect.

In the above, many different embodiments have been described. It should be appreciated that further embodiments may be provided by the combination of any two or more of the embodiments described above.

DESCRIPTION OF FIGURES

Embodiments will now be described, by way of example only, with reference to the accompanying Figures in which:

FIG. 8 shows a signalling diagram according to an example embodiment.

DETAILED DESCRIPTION

Before explaining in detail the examples, certain general principles of a wireless communication system and mobile communication devices are briefly explained with reference to FIGS. 1 to 3 to assist in understanding the technology underlying the described examples.

Figure 1:
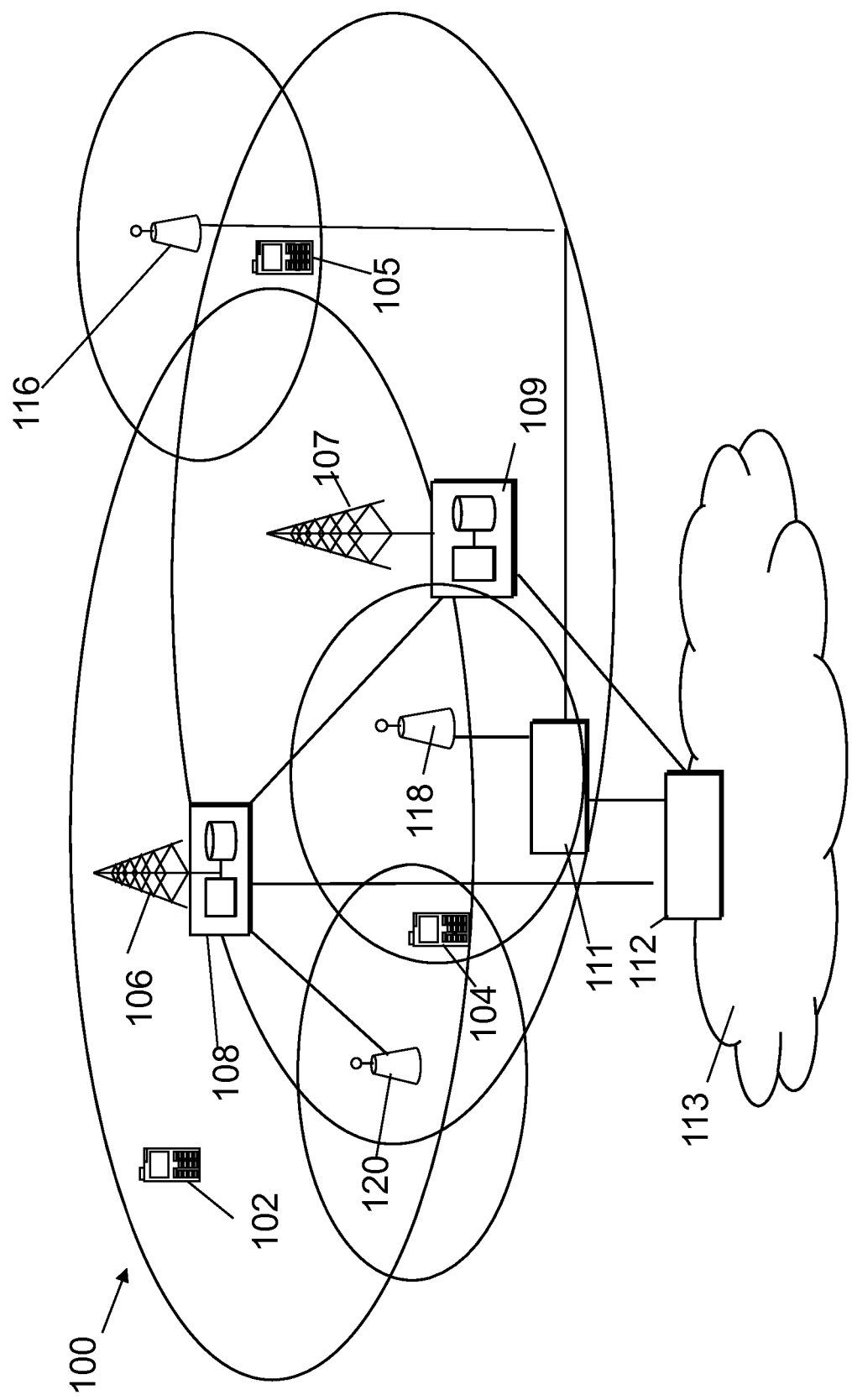
FIG. 1 shows a schematic diagram of an example communication system comprising a base station and a plurality of communication devices.

In a wireless communication system 100, such as that shown in FIG. 1, mobile communication devices or user equipment (UE) 102, 104, 105 are provided wireless access via at least one base station (e.g. next generation NB, gNB) or similar wireless transmitting and/or receiving node or point. Base stations may be controlled or assisted by at least one appropriate controller apparatus, so as to enable operation thereof and management of mobile communication devices in communication with the base stations. The controller apparatus may be located in a radio access network (e.g. wireless communication system 100) or in a core network (CN) (not shown) and may be implemented as one central apparatus or its functionality may be distributed over several apparatuses. The controller apparatus may be part of the base station and/or provided by a separate entity such as a Radio Network Controller. In FIG. 1 control apparatus 108 and 109 are shown to control the respective macro level base stations 106 and 107. The control apparatus of a base station can be interconnected with other control entities. The control apparatus is typically provided with memory capacity and at least one data processor. The control apparatus and functions may be distributed between a plurality of control units. In some systems, the control apparatus may additionally or alternatively be provided in a radio network controller.

In FIG. 1 base stations 106 and 107 are shown as connected to a wider communications network 113 via gateway 112. A further gateway function may be provided to connect to another network.

The smaller base stations 116, 118 and 120 may also be connected to the network 113, for example by a separate gateway function and/or via the controllers of the macro level stations. The base stations 116, 118 and 120 may be pico or femto level base stations or the like. In the example, stations 116 and 118 are connected via a gateway 111 whilst station 120 connects via the controller apparatus 108. In some embodiments, the smaller stations may not be provided. Smaller base stations 116, 118 and 120 may be part of a second network, for example WLAN and may be WLAN APs.

The communication devices 102, 104, 105 may access the communication system based on various access techniques, such as code division multiple access (CDMA), or wideband CDMA (WCDMA). Other non-limiting examples comprise time division multiple access (TDMA), frequency division multiple access (FDMA) and various schemes thereof such as the interleaved frequency division multiple access (IFDMA), single carrier frequency division multiple access (SC-FDMA) and orthogonal frequency division multiple access (OFDMA), space division multiple access (SDMA) and so on.

An example of wireless communication systems are architectures standardized by the 3rd Generation Partnership Project (3GPP). A latest 3GPP based development is often referred to as the long term evolution (LTE) of the Universal Mobile Telecommunications System (UMTS) radio-access technology. The various development stages of the 3GPP specifications are referred to as releases. More recent developments of the LTE are often referred to as LTE Advanced (LTE-A). The LTE (LTE-A) employs a radio mobile architecture known as the Evolved Universal Terrestrial Radio Access Network (E-UTRAN) and a core network known as the Evolved Packet Core (EPC). Base stations of such systems are known as evolved or enhanced Node Bs (eNBs) and provide E-UTRAN features such as user plane Packet Data Convergence/Radio Link Control/Medium Access Control/Physical layer protocol (PDCP/RLC/MAC/PHY) and control plane Radio Resource Control (RRC) protocol terminations towards the communication devices. Other examples of radio access system comprise those provided by base stations of systems that are based on technologies such as wireless local area network (WLAN) and/or WiMax (Worldwide Interoperability for Microwave Access). A base station can provide coverage for an entire cell or similar radio service area. Core network elements include Mobility Management Entity (MME), Serving Gateway (S-GW) and Packet Gateway (P-GW).

An example of a suitable communications system is the 5G or NR concept. Network architecture in NR may be similar to that of LTE-advanced. Base stations of NR systems may be known as next generation Node Bs (gNBs). Changes to the network architecture may depend on the need to support various radio technologies and finer QoS support, and some on-demand requirements for e.g. QoS levels to support QoE of user point of view. Also network aware services and applications, and service and application aware networks may bring changes to the architecture. Those are related to Information Centric Network (ICN) and User-Centric Content Delivery Network (UC-CDN) approaches. NR may use multiple input-multiple output (MIMO) antennas, many more base stations or nodes than the LTE (a so-called small cell concept), including macro sites operating in co-operation with smaller stations and perhaps also employing a variety of radio technologies for better coverage and enhanced data rates.

Future networks may utilise network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations to be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent.

An example 5G core network (CN) comprises functional entities. The CN is connected to a UE via the radio access network (RAN). An UPF (User Plane Function) whose role is called PSA (PDU Session Anchor) may be responsible for forwarding frames back and forth between the DN (data network) and the tunnels established over the 5G towards the UE(s) exchanging traffic with the DN.

The UPF is controlled by an SMF (Session Management Function) that receives policies from a PCF (Policy Control Function). The CN may also include an AMF (Access & Mobility Function).

Figure 2:
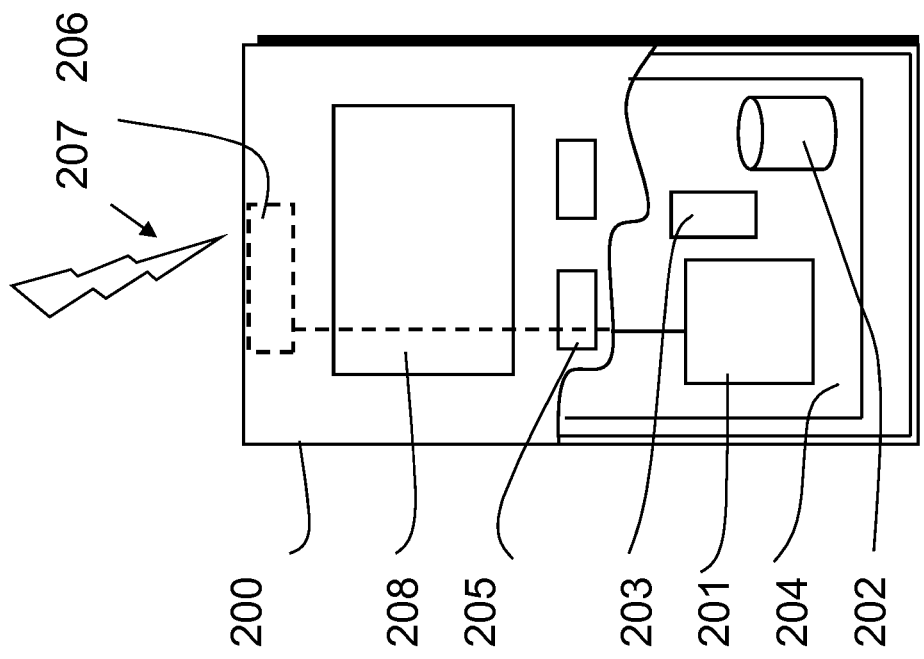
FIG. 2 shows a schematic diagram of an example mobile communication device.

A possible mobile communication device will now be described in more detail with reference to FIG. 2 showing a schematic, partially sectioned view of a communication device 200. Such a communication device is often referred to as user equipment (UE) or terminal. An appropriate mobile communication device may be provided by any device capable of sending and receiving radio signals. Non-limiting examples comprise a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services comprise two-way or multi-way calls, data communication or multimedia services or simply an access to a data communications network system, such as the Internet. Users may also be provided broadcast or multicast data. Non-limiting examples of the content comprise downloads, television and radio programs, videos, advertisements, various alerts and other information.

In an industrial application a communication device may be a modem integrated into an industrial actuator (e.g. a robot arm) and/or a modem acting as an Ethernet-hub that will act as a connection point for one or several connected Ethernet devices (which connection may be wired or unwired).

A mobile device is typically provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 204. The user may control the operation of the mobile device by means of a suitable user interface such as key pad 205, voice commands, touch sensitive screen or pad, combinations thereof or the like. A display 208, a speaker and a microphone can be also provided. Furthermore, a mobile communication device may comprise appropriate connectors (either wired or wireless) to other devices and/or for connecting external accessories, for example hands-free equipment, thereto.

The mobile device 200 may receive signals over an air or radio interface 207 via at least one appropriate apparatus for receiving and may transmit signals via at least appropriate apparatus for transmitting radio signals. In FIG. 2 transceiver apparatus is designated schematically by block 206. The transceiver apparatus 206 may be provided for example by means of a radio part and associated antenna arrangement. The antenna arrangement may be arranged internally or externally to the mobile device. The antenna arrangement may comprise multiple antenna panels.

Figure 3:
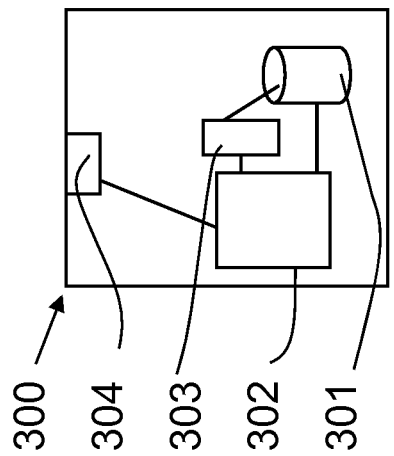
FIG. 3 shows a schematic diagram of an example control apparatus.

FIG. 3 shows an example embodiment of a control apparatus for a communication system, for example to be coupled to and/or for controlling a station of an access system, such as a RAN node, e.g. a base station, eNB or gNB, a relay node or a core network node such as an MME or S-GW or P-GW, or a core network function such as AMF/SMF, or a server or host. The method may be implanted in a single control apparatus or across more than one control apparatus. The control apparatus may be integrated with or external to a node or module of a core network or RAN. In some embodiments, base stations comprise a separate control apparatus unit or module. In other embodiments, the control apparatus can be another network element such as a radio network controller or a spectrum controller. In some embodiments, each base station may have such a control apparatus as well as a control apparatus being provided in a radio network controller. The control apparatus 300 can be arranged to provide control on communications in the service area of the system. The control apparatus 300 comprises at least one memory 301, at least one data processing unit 302, 303 and an input/output interface 304. Via the interface the control apparatus can be coupled to a receiver and a transmitter of the base station. The receiver and/or the transmitter may be implemented as a radio front end or a remote radio head.

Positioning is an important part of Radio Access Networks (RAN). Accurate location knowledge is an important requirement for various services such as emergency services, vehicular related use cases, and factories of the future. Location-based services (e.g., advertisement push, car parking and augmented reality) are also in use.

LTE positioning is based on downlink Positioning Reference Signals (PRS) received from multiple eNBs in a synchronized network. UE performs OTDOA (Observed Time Difference of Arrival) measurements. Another method for LTE positioning is Uplink TDOA (UTDOA), where uplink time of arrival measurements are performed at multiple receiving points based on Sounding Reference Signals (SRSs).

Figure 4:
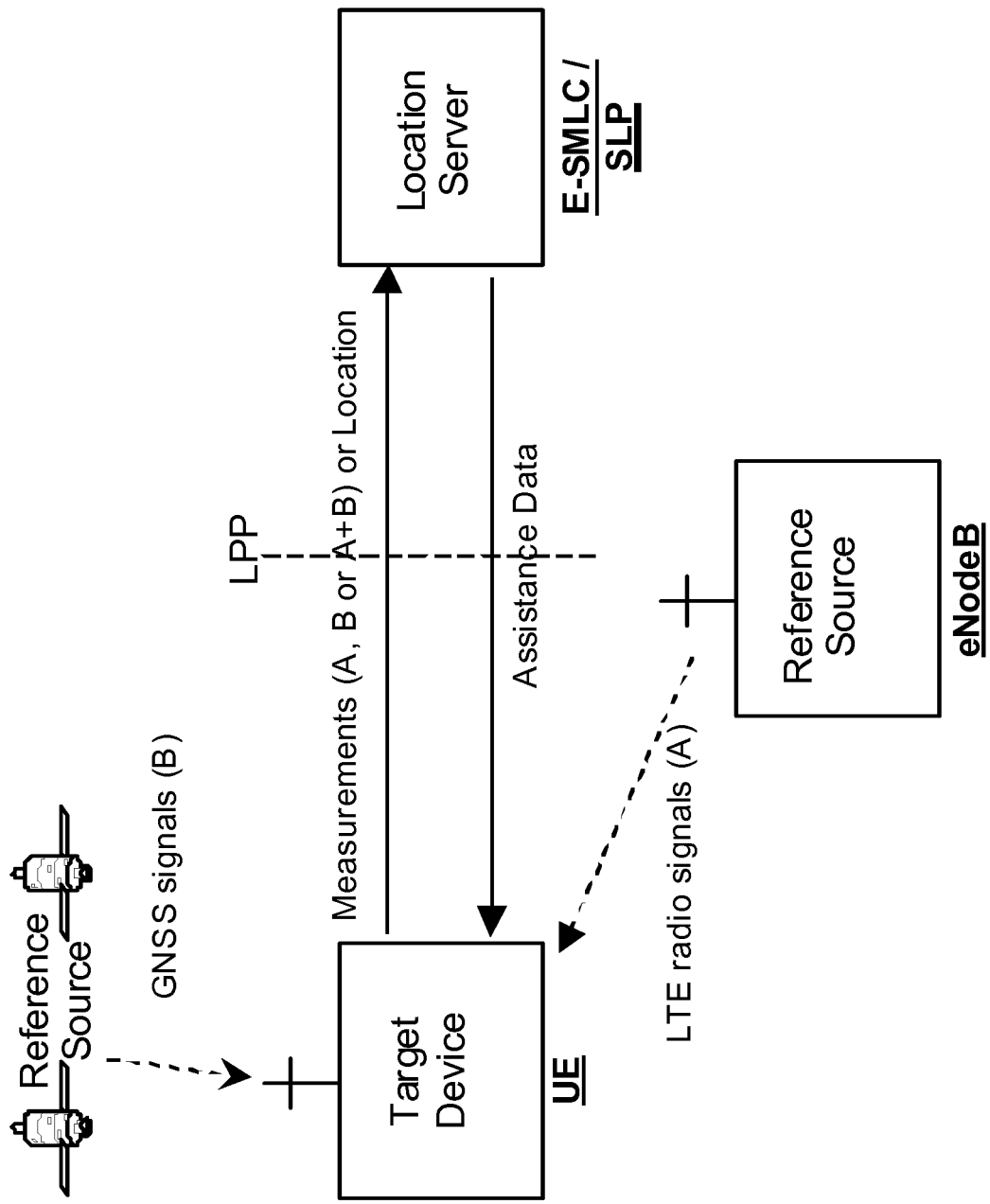
FIG. 4 shows a schematic diagram of location positioning protocol (LPP) configuration for control- and user-plane positioning in E-UTRAN.

LTE system positioning is based on TDOA measurements from multiple locations. A location server processes the measurements and estimates the position. LTE Positioning Protocol (LPP) is used point-to-point between a location server (E-SMLC) and a target device (UE) in order to position the target device using position-related measurements obtained by one or more reference sources. FIG. 4 shows a schematic diagram of an LP configuration for control- and user-plane configuration in E-UTRAN, An LPP session is used between a Location Server and the target device in order to obtain location related measurements or a location estimate or to transfer assistance data. A single LPP session is used to support a single location request.

Positioning in NR is being studied (e.g., in 3GPP Technical Report 38.855). In NR, the operation in frequency range 1 (FR1) and frequency range 2 (FR2) and the utilization of massive antenna arrays provides additional degrees of freedom which may improve the positioning accuracy compared to LTE.

Massive antenna systems (massive MIMO) provide additional degrees of freedom which may enable more accurate user location by exploiting spatial and angular domains of propagation channel in combination with time measurements.

The use of wider bandwidths in NR may provide better time of arrival (TOA) resolution. The presence of massive antenna systems may bring further dimensions to the study of beam angles and TOA triangulation. Moreover the flexible NR network architecture may enable a more efficient signal over the air interface and positioning solution.

It has been proposed that NR positioning should minimize physical layer signals, e.g., on-demand reference signal (RS), overhead.

An overview of positioning use cases and potential requirements has been provided. One use case is "High accuracy positioning". High accuracy position includes requirements that the location information is acquired quickly, is reliable, and is available (e.g., it is possible to determine the position). The following accuracy requirements for indoor commercial use cases have been proposed: horizontal positioning error <3 m for 80% of UEs and vertical positioning error <[3]m for [80]% of UEs. Both timing and angle-based techniques have been considered.

Using single link positioning is has been proposed. Single link positioning is based either on DL or UL signaling and requires that the UE (if in downlink) or the gNB (in uplink) processes the receiving signal to estimate the Angle-of-Arrival, Angle-of-Departure and time-delay. This concept is targeted for high carrier frequencies utilizing narrow beamwidths and wide bandwidths. The method relies on a physical model of radio channel where from the knowledge of the antenna structure the actual channel matrix may be determine from the radio-frequency (RF) viewpoint. However, in this method detailed information about the UE antenna is needed in the network.

To overcome this, an exchange of local beam direction and beam-width information related to the communication links between the UE and the gNB has been suggested so that the gNB and the UE identify the preferred beam directions independently and locally. The exchange of this information is required when position information needs to be computed by gNB or UE. It is shown that below one-meter accuracy is achievable and that positioning accuracy depends on signal quality and available number of reflected paths.

Figure 5:
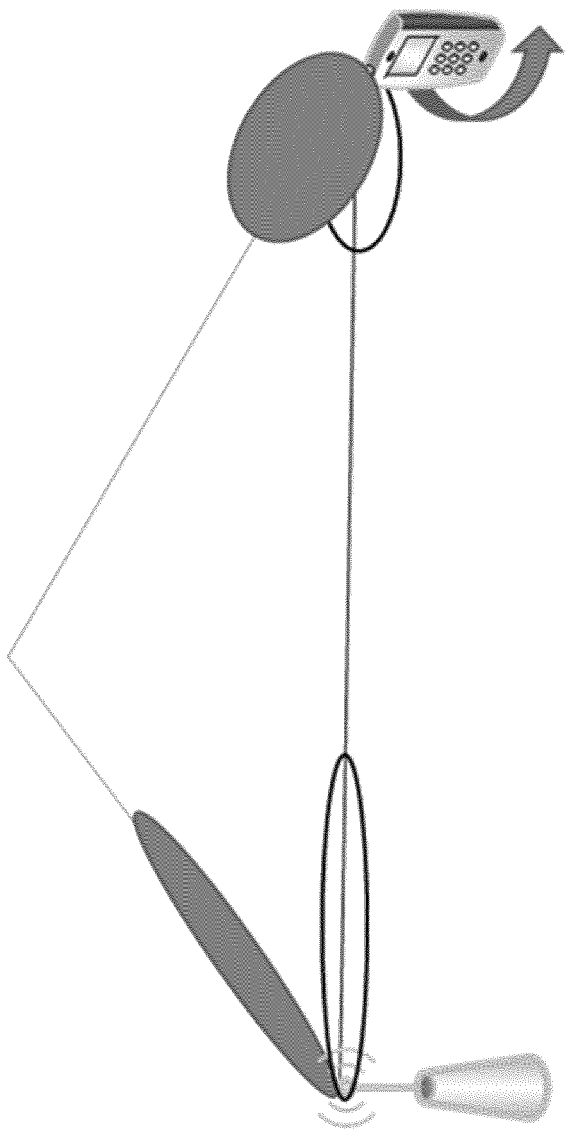
FIG. 5 shows a schematic diagram of a 5G beam based communication system.

FIG. 5 illustrates beam-based operation between UE and gNB, where communication occurs over line-of-sight (LOS) direction and the reflected path (non-LOS).

There is native support for beam-based operations in UL & DL in Rel-15 NR (FR2), which provides basis to build beam-based positioning in the coming 3GPP releases and for frequency bands beyond 52.6 GHz, which have a very high beam resolution.

New Radio at above 6 GHz has native support for beam-based operation with gNBs/transmission points (TRP) and UEs equipped with multiple-antenna and large antenna arrays (>6 GHz). TR 38.855 defines FR2 UE multi panel details for the positioning evaluation studies. NR at above 6 GHz has enhanced separability of radio channel in spatial domain (EIRP), beam-widths @TX, RX, side-lobes of beam, carrier frequency, etc. Due to the use of wide bandwidths (up to 400 MHz in Rel-15), the separability of signals propagated over radio channel in time is relatively accurate.

NR Rel'15 provides positioning support via UE measurements for global navigation satellite system (GNSS) (defined in TS 38.215). This may not be useful indoors or Umi scenarios (since LoS between satellites and UE is required). NR Rel-15 system itself does not provide support positioning. However, there are several functionalities that support beam-based positioning. For example, different DL and UL beam management procedures (P1-P3, U1-U3) including beam indication, beam measurements and reporting, and beam recovery has been specified in Rel-15.

NR Rel-15 provides support for beam reporting (non- and group-based reporting modes) and a beam report (L1-received signal reference power (RSRP), CSI-RS Resource Indicator (CRI)/Synchronization signal block resource index (SSBRI)) which supports non-differential and differential.

Rel-15 NR provides support for different RSs and signals. DL RSs include but are not limited to CSI-RS (beam management (BM), tracking reference signal (TRS), CSI acquisition, interference management (IM)), demodulation reference signals (DMRS) (physical downlink shared channel (PDSCH), packet data channel (PDCH), physical broadcast channel (PBCH)), phase tracking reference signal (PTRS). UL RSs and signals include but are not limited to: SRS, PTRS, DMRS (physical uplink shared channel (PUSCH), physical uplink control channel (PUCCH), physical random access channel (PRACH) preamble.

The method targeted for New Radio beam based operation (especially for beyond 6 GHz) is based on the exchange of local beam direction and beam-width information related to the communication links between UE or gNB. With this method UE position may be estimated with single transmission point (such as the communication system shown in FIG. 4), with no requirement for a location server.

Principles for the exchange of beam direction and beam-width information between UE and gNB have been defined as the following. In UL mode, a gNB gathers beam based information from UE that is related to NLoS and LoS links. The information associated with NLoS and LoS links includes direction of the beam aligned with LoS and NLoS links (estimated accurately with bearing signal processing or associated to received signal strengths) and distance (measured based on UL reference signals/signals, e.g. SRS/DMRS, PRACH, at gNB).

The UE reports beam direction used for the associated UL reference signal/signal transmission. The different beam link pairs for LoS and NLoS links may be identified separately or as part of the beam information exchange.

In DL mode, the UE gathers beam based information from a gNB that is related to NLoS and LoS links. The information associated with NLoS and LoS links includes direction (estimated accurately with bearing signal processing or associated to received signal strengths) of the beam aligned with LoS and NLoS links and distance (measured based on DL reference signals/signals, e.g. SRS/DMRS, PRACH at gNB).

The gNB reports beam direction used for associated DL reference signal/signal transmission. The different beam link pairs for LoS and NLoS links may be identified separately or as part of the beam information exchange.

Potential new services will have different positioning accuracy requirements according to each service type. To provide support for different services with diverse positioning accuracy requirements, NR Rel-16 and beyond may provide support for a flexible beam based positioning signaling mechanism between UE and gNB. The signalling mechanism should have reduced signaling overhead without sacrificing positioning performance. As discussed, NR Rel-15 does not provide support for beam based positioning and related signaling mechanisms.

The following aims to provide a signalling solution for the exchange of information between the UE and gNB with minimum signalling overhead and designed for 3GPP New Radio.

Figure 6:
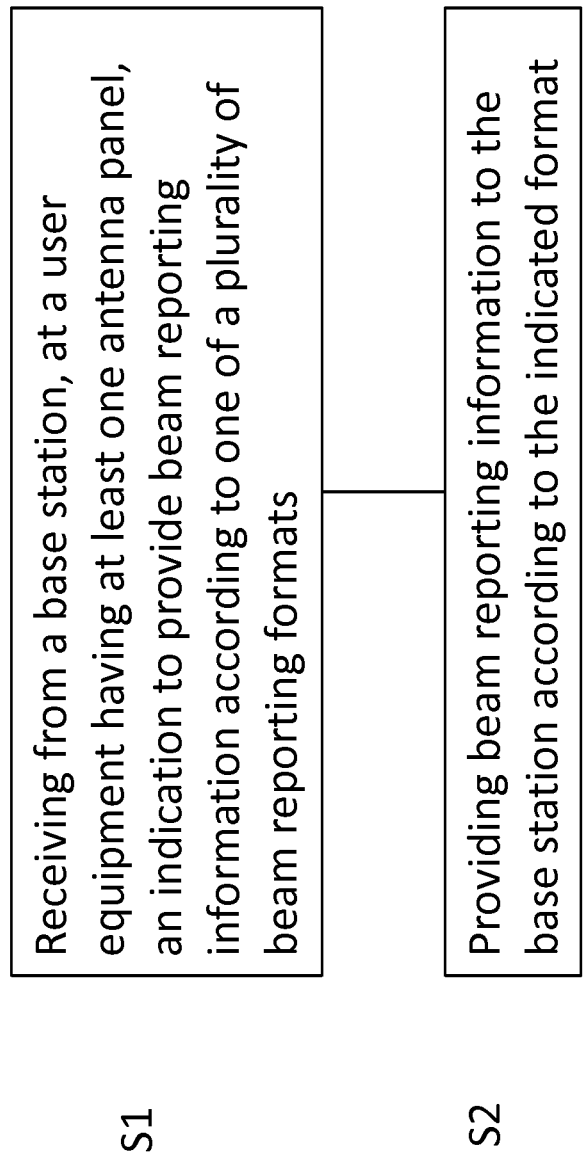
FIG. 6 shows a flowchart of a method according to an example embodiment.

FIG. 6 shows a flowchart of a method according to an example embodiment.

In a first step, S1, the method comprises receiving from a base station, at a user equipment having at least one antenna panel, an indication to provide beam reporting information according to one of a plurality of beam reporting formats.

In a second step, S2, the method comprises providing beam reporting information to the base station according to the indicated format.

Figure 7:
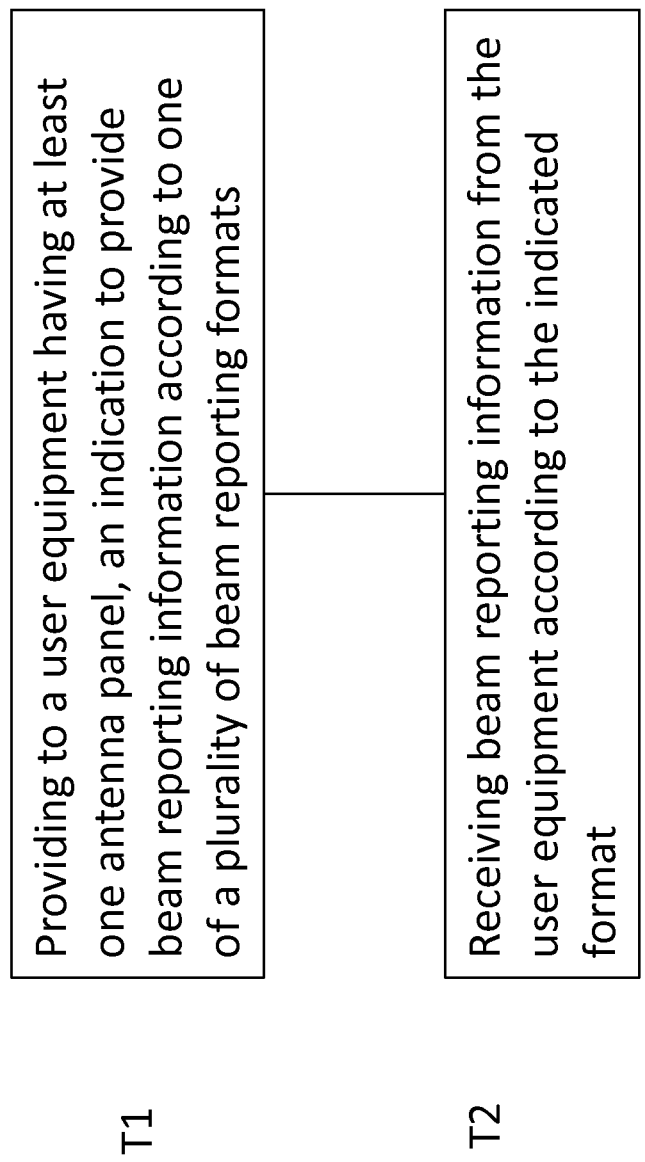
FIG. 7 shows a flowchart of a method according to an example embodiment.

FIG. 7 shows a flowchart of a method according to an example embodiment.

In a first step, T1, the method comprises providing to a user equipment having at least one antenna panel, an indication to provide beam reporting information according to one of a plurality of beam reporting formats.

In a second step, T2, the method comprises receiving beam reporting information from the user equipment according to the indicated format.

The beam reporting information may be beam based positioning reporting information, i.e., beam reporting information for use in determining at least one of user equipment positioning and user equipment orientation.

The method may comprise receiving an indication to activate or deactivate one or more of the at least one antenna panels.

The indication to provide at least one beam report according to one of a plurality of beam reporting formats or the indication to activate or deactivate one or more of the at least one antenna panels may be provided in a DCI associated with PDCCH or a MAC CE based trigger or Radio Resource Control (RRC) based signalling.

There may be separate DCI or MAC CE based triggering or RRC based configuration that defines which antenna panels are to be activated or deactivated for positioning measurements. This antenna panel activation/deactivation can be used be with any or the reporting formats e.g., coarse, differential or full-level report.

For DCI trigger, an additional bit may be added to define whether to take into account DCI based triggering or not at UE-side. If the additional bit is defined as zero, MAC CE or RRC based configured antenna panels are used for beam based positioning measurements.

In an embodiment where the indication to provide at least one beam report according to one of a plurality of beam reporting formats is not DCI based, MAC CE or RRC based signalling may be used to define UE antenna panels for beam based positioning measurements.

In an example embodiment, when the indication to provide at least one beam report according to one of a plurality of beam reporting formats is provided in a DCI, a dedicated bit-vector with length of M is included as a part of downlink or uplink grant to dynamically trigger activation or de-activation of one or more UE antenna panels for beam based positioning measurements. M−1 elements in the bit-vector is associated one-to-one with UE RX antenna panel ID matching with physical UE RX antenna panels and one element (the last M-th) defines the entire bit vector to be active or deactive. When the value of the element from the first to M−1 element in the bit vector is 1 the corresponding antenna panel and related ID are activated. When the value of the last M-th element is 0 all M−1 preceding element values are not taken into account and antenna panels triggered by MAC CE or configured by RRC are used for positioning measurements. When the value of the M-th element is 1 all M−1 preceding element values are taken into account at UE. When the value of the elements (1 to M−1) in the bit vector is 0 the corresponding antenna panel and related ID are de-activated. When multiple elements (1 to M−1) in the bit-vector have values equal to 1 or 0 the corresponding antenna panels are simultaneously activated or de-activated, respectively.

In an embodiment where the indication to provide at least one beam report according to one of a plurality of beam reporting formats is not DCI based, MAC CE or RRC based signalling may be used to define UE antenna panels for beam based positioning measurements.

When the indication is provided in MAC CE based signalling, MAC CE may initialize or overwrite one or more antenna panels to be activated or deactivated for beam based positioning measurements.

When the indication is provided in RRC based signalling, RRC may initialize or overwrite one or more antenna panels to be activated or deactivated for beam based positioning measurements.

The beam reporting information may be provided periodically, semi-persistently, or aperiodically.

The plurality of beam reporting formats may comprise three levels: coarse, full and differential.

The beam reporting information may comprise an indication of received beam direction, an indication of received beam width and/or time delay information. In a differential-level report, the indication of beam direction or the time delay information may comprise a differential value.

In a first example embodiment, the coarse level beam reporting format is a UE coarse-level antenna panel-wise beam based positioning reporting format. The beam report may be delivered, e.g., via uplink physical control channel (PUCCH) or uplink physical shared channel (PUSCH) or PUSCH with new radio version of LTE location protocol (NR-LPP).

A coarse-level beam report may comprise an indication of the antenna panels used for measurement. A coarse-level beam report may comprise a bit vector with a length of N, where N is the number of RX antenna panels at UE-side. Each element in a bit field may be mapped implicitly to the placement of UE antenna panels in local coordinates, e.g., for a UE equipped with four antenna panels the length of bit vector is four bits, where bit field indicates which antenna panel are used for a measurement and not.

When the coarse-level beam based positioning format is triggered using DCI or MAC CE with antenna panel activation or deactivation (as described earlier) for beam based positioning measurements, UE reports either 1 (active) or 0 (deactive) as value for activated antenna panels. The rest of the elements in the bit-vector remain as 0.

It may be assumed that when using coarse level positioning report format, all antenna panels are either triggered with DCI or MAC CE or configured by RRC to be active. It may also be possible to configure only a sub-set of antenna panels to be active for beam based positioning measurements. Then, the UE reports which of UE RX antenna panels out of N UE RX panels are used for positioning measurements.

Based on the capability signalling between UE and network (as discussed below), the network may be implicitly aware of boresight direction of different antenna panels with respect to the first antenna panel. Therefore, based on coarse level report, the network may have an understanding from which direction in local coordinates UE has measurement downlink reference signal used for positioning measurements. In addition to implicit coarse level RX reception direction in local coordinates the coarse-level reporting format may also include signal propagation time delay information for a specific TX-RX beam pair. As discussed above, the measurement for coarse-level report is bit-map information associated with actual UE antenna panels and signal propagation time delay.

Time delay information associated with a measured TX and RX beam pair for a positioning may be included or excluded in a beam reporting format. If time delay information is included in a coarse-level beam report, a coarse level beam report may comprise a bit vector with length of N associated with UE antenna panels (as described above) and a bit vector length of K associated with quantized propagation time delay values. The network may configure a value range for the quantized propagation time delay values separately by RRC-signalling. Each element of bit vector length of K is associated with this value range.

In a second example embodiment, the full level beam reporting format is a UE full-level antenna panel-wise beam-based positioning reporting format to be delivered e.g. via PUCCH or PUSCH or PUSCH with NR-LPP.

A full level beam report may comprise an indication of the antenna panels used for measurement. For example, a full level beam report may comprise a bit vector with length of N, where N is the number of RX antenna panels at UE-side (similar to a coarse-level beam report) where each bit field in vector with the value of '0/1' indicates which antenna panels are used for a measurement.

Alternatively, a selected antenna panel index may be included in a full level beam report according to indicated antenna panels via DCI, MAC-CE or RRC for beam based positioning measurements. When the full-level beam based positioning format is triggered with antenna panel activation or deactivation for beam based positioning measurements, UE reports either 1 (active) or 0 (deactive) as value for activated antenna panels. The rest of the elements in the bit-vector remain as 0.

The antenna panel index reporting may be omitted and the rest of the elements in the full report may be reported.

A full-level beam report may comprise an indication of received beam direction per antenna panel and/or beam width. For example, a full level beam report may comprise UE RX beam direction in azimuth and elevation angles in local coordinates, where the direction can be reported with Q-bit, where the value of Q defines the number of quantization levels for both azimuth and elevation angles or separately for azimuth and elevation domains. Alternatively, the beam direction may be reported without quantisation.

A full-level beam report may comprise UE RX beam width information in degrees which may have different quantized options. UE RX beam width information may be optional and it is up to the network if it is configured by higher layer signaling to be reported or not.

When time delay information associated with a measured TX and RX beam pair for a positioning is included in a full level beam report, a bit vector length of K associated with propagation time delay values, where the direction can be reported with or without quantization is reported in addition to the above parameters.

In a third example embodiment, a differential-level beam report format comprises a UE differential-level antenna panel-wise beam-based positioning reporting format to be delivered e.g. via PUCCH or PUSCH or PUSCH with NR-LPP.

Time delay information or indication of received beam direction may comprise a differential value. In a differential level beam report, differential in delay with respect to the maximum reported delay, or previously reported delay if the beam pairs have not changed, and a differential with respect to previously reported RX beam direction or one RX beam direction reported from the same panel is included.

A differential-level over antenna panels beam based positioning reporting format to be delivered e.g. via PUCCH, or PUSCH or PUSCH with NR-LPP is defined which includes over-antenna panels.

At least one antenna panel may be a reference antenna panel and the differential value is provided with respect to an indication of received beam direction or time delay information for the reference antenna panel To reduce the amount of reporting signaling overhead, one antenna panel may act as a reference point for the beam information to be reported. When differential beam based positioning report consist of multiple antenna panel-wise reports, the first reported antenna panel may act as reference point for differential values in terms of delay (maximum value therein) and receive beam direction for the rest of the antenna panel-wise reports.

In one example embodiment, when a network configures, by RRC-signaling, the number of UE antenna panels to be reported in a beam based positioning report, UE capability information associated with antenna panels is taken into account. Based on UE capability signaling information, the network is aware of UE antenna panel orientation in local coordinates, e.g. UE antenna panel 1 boresight is directed at zero degrees and antenna panel 2 at 90 degrees with respect to antenna panel 1, etc.

Based on UE capability signaling information between network and UE information, the network may be aware of UE RX beam width information. UE capability signalling occurs when UE transferring from initial access to connected mode UE.

Depending on CSI report configuration, the network may have configured reported UE RX beam directions with different quantization level options, e.g. 2-bit or 4-bit quantization or more. A network may configure a UE to report also UE RX beam width for positioning by RRC-signalling. To enable the computation of a beam positioning report at UE-side, NR Rel-15 NZP-CSI-RS based DL beam management CSI measurement and reporting configurations may be leveraged.

FIG. 8 shows an example of a connected mode signaling mechanism for a full-level beam report for beam based positioning in NR Rel-16 or beyond.

A network jointly triggers a transmission of the set of aperiodic non-zero power (NZP) channel state information reference signal (CSI-RS) resources and beam positioning report on PUCCH via DCI associated with PDCCH. The configured set of aperiodic NZP CSI-RS resources may be the same as for UE RX beam training and/or channel state acquisition (resources are transmitted with same spatial domain filter in set). Prior to beam based positioning reporting, NZP CSI-RS resources for beam based positioning have been obtained via synchronization signal block (SSB) or NZP based TX-RX beam pair identification procedure.

When DL NZP CSI-RS resources associated with DL TX beams are transmitted, UE selects RX beams in azimuth and elevation domain in local coordinates and antenna panels to be reported in beam based positioning report. Furthermore, the beam width information in degrees (or quantized beam width information) is enclosed into the report.

Alternatively, without specific NZP CSI-RS transmission for beam based positioning reporting, the UE reports the same UE RX beams and panels as used for UE RX beam training.

Depending on the CSI reporting configuration, the UE reports, via PUCCH, selected antenna panel indices associated with UE RX beam directions in azimuth and elevation angles as well as RX beam width.

After the UE has provided the beam based positioning report, based on the positioning report, the network may schedule an uplink sounding reference signal (SRS) set with aperiodic resources transmission to obtain antenna panel information associated with RX beam information (RX beams in azimuth and elevation domain in local coordinates) at gNB-side. Furthermore, based on SRS transmission gNB may compute for each UL TX-RX beam pair transmitted signal traverse time (time delay as referred earlier). Based on this information and the positioning report, the gNB can compute UE location in global coordinate system. The method how to compute UE global positioning information may be vendor specific.

Other beam based positioning formats such as coarse-level and differential-level may be obtained via a similar signaling mechanism as shown in FIG. 8. Naturally, the content of reporting format differs with respect to full-level reporting.

The proposed beam based positioning reporting formats are not restricted to physical layer signaling via PUCCH or PUSCH, but may be signaled via NR-LPP, where the network entity performs the computation of UE positioning.

In the following an example implementation of the service requirement based positioning format selection is described. A beam based positioning accuracy is estimated based on the variables that impact on the accuracy and then estimated positioning accuracy is compared to the required accuracy. The required accuracy is defined by the service requirement. Estimated positioning accuracy is calculated based on parameters that affect positioning accuracy. Those parameters include but are not limited too, for example, received signal level, received signal quality, distance between UE and gNB, carrier bandwidth, beam-width, carrier frequency, number of beam pairs, availability of LOS link and availability of position pre-knowledge.

The following example describes the key steps of the service based positioning format selection.

In a first step a "requiredAccuracy" is defined based on the use case/scenario/service In a second step, a starting reporting format based on "requiredAccuracy" is defined.

In a third step UE-gNB signalling with the selected reporting format is executed.

In a fourth step, "estimatedAccuracy" based a set of variables impacting on the positioning accuracy is calculated.

In a fifth step, "estimatedAccuracy" and "requiredAccuracy" are compared. If the difference exceeds a threshold, the reporting format may be adjusted and return to the third step.

In a sixth step, positioning on the selected reporting format is continued. The third or fourth step may be returned to on a need basis, e.g. after a pre-defined time period or on a change in the variables that impact on the accuracy.

The method may efficiently convey information required for beam based positioning from a UE to a gNB. More specifically, to enable support for different positioning accuracy requirements, different reporting formats are addressed. The proposed reporting scheme may provide an alternative approach for beam based positioning without network work based multi-lateral positioning, such as that used in LTE. The proposed idea may enable either single gNB or UE based information exchange to perform positioning.

The proposed signalling may support network-centric or UE-centric positioning. The proposed signaling may support high accuracy positioning. With a method as described above, UE position may be estimated with single transmission point and there is no requirement for a location server such as in the LTE system.

Different formats facilitate signaling overhead adaptation in UL and DL according to positioning use case/scenario/service.

This is one solution for beam-based positioning in the new releases of NR. It is expected that several positioning methods will co-exist in New Radio like in LTE. The proposed method utilizes beam-based operation and may be useful for high accuracy positioning on FR2 and later for beyond 52.6 GHz bands.

High accuracy and/or single eNB and/or network or UE side positioning may be important for vertical use cases like vehicles, robots, industrial systems etc.

The methods may be implemented in a user equipment as described with reference to FIG. 2 or a control apparatus as described with reference to FIG. 3.

An apparatus may comprise means for receiving an indication from a base station, at a user equipment having at least one antenna panel, to provide beam reporting information according to one of a plurality of beam reporting formats and providing beam reporting information to the base station according to the indicated beam reporting format.

Alternatively, or in addition, an apparatus may comprise means for providing an indication to a user equipment having at least one antenna panel to provide beam reporting information according to one of a plurality of beam reporting formats and receiving beam reporting information from the user equipment according to the indicated beam reporting format.

It should be understood that the apparatuses may comprise or be coupled to other units or modules etc., such as radio parts or radio heads, used in or for transmission and/or reception. Although the apparatuses have been described as one entity, different modules and memory may be implemented in one or more physical or logical entities.

It is noted that whilst embodiments have been described in relation to LTE and 5G NR, similar principles can be applied in relation to other networks and communication systems where beam reporting is used. Therefore, although certain embodiments were described above by way of example with reference to certain example architectures for wireless networks, technologies and standards, embodiments may be applied to any other suitable forms of communication systems than those illustrated and described herein.

It is also noted herein that while the above describes example embodiments, there are several variations and modifications which may be made to the disclosed solution without departing from the scope of the present invention.

In general, the various example embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Example embodiments of this invention may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples.

Example embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed, there is a further embodiment comprising a combination of one or more embodiments with any of the other embodiments previously discussed.

The invention claimed is:

1. An apparatus, comprising:
   at least one processor; and
   at least one memory including computer program code, the at least one memory and computer program code being configured, with the at least one processor, to cause the apparatus to perform:
      receiving an indication from a base station, at a user equipment having at least one antenna panel, to provide beam reporting information according to one of a plurality of beam reporting formats; and
      providing beam reporting information to the base station according to the indicated beam reporting format,
      wherein the beam reporting information is for use in determining user equipment positioning and user equipment orientation,
      wherein the indicated beam format is determined based on a position accuracy requirement,
      wherein the beam reporting format comprises coarse-level, full-level and differential-level reporting formats,
      wherein the at least one memory and computer program code are further configured, with the at least one processor, to cause the apparatus to perform:
      receiving the indication from the base station in downlink control information associated with a medium access control, MAC, control element;
      receiving an indication to activate or deactivate one or more of the at least one antenna panels in downlink control information associated with a medium access control, MAC, control element.

2. The apparatus according to claim 1, wherein the at least one memory and computer program code are further configured, with the at least one processor, to cause the apparatus to perform providing the beam reporting information aperiodically.

3. The apparatus according to claim 1, wherein the beam reporting information comprises an indication of the antenna panels used for beam measurement.

4. The apparatus according to claim 1, wherein the beam reporting information comprises an indication of at least one received beam direction per antenna panel.

5. The apparatus according to claim 4, wherein the indication of received beam direction comprises a differential value per antenna panel.

6. The apparatus according to claim 5, wherein one of the at least one antenna panels is a reference antenna panel and said differential value is provided with respect to an indication of received beam direction for the reference antenna panel.

7. The apparatus according to claim 1, wherein the beam reporting information comprises an indication of received beam width.

8. The apparatus according to claim 7, wherein the beam reporting information comprises time delay information.

9. The apparatus according to claim 8, wherein the time delay information comprises a differential value.

10. The apparatus according to claim 9, wherein one of the at least one antenna panels is a reference antenna panel and said differential value is provided with respect to time delay information for the reference antenna panel.

11. The apparatus according to claim 1, wherein the position accuracy is based on parameters which affect the positioning accuracy.

12. The apparatus according to claim 1, wherein the at least one memory and computer program code are further configured, with the at least one processor, to cause the apparatus to perform providing the beam reporting information using a physical uplink control channel or a physical uplink shared channel.

13. An apparatus comprising:
at least one processor; and
at least one memory including computer program code, the at least one memory and computer program code being configured, with the at least one processor, to cause the apparatus to perform:
providing an indication to a user equipment having at least one antenna panel to provide beam reporting information according to one of a plurality of beam reporting formats; and
receiving beam reporting information from the user equipment according to the indicated beam reporting format,
wherein the beam reporting information is for use in determining user equipment positioning and user equipment orientation,
wherein the indicated beam format is determined based on a position accuracy requirement,
wherein the beam reporting format comprises coarse-level, full-level and differential-level reporting formats,
wherein the at least one memory and computer program code are further configured, with the at least one processor, to cause the apparatus to perform:
providing the indication to the user equipment in downlink control information associated with a medium access control, MAC, control element; and
providing an indication to activate or deactivate one or more of the at least one antenna panels in downlink control information associated with a medium access control, MAC, control element.

14. A method, comprising:
receiving an indication from a base station, at a user equipment having at least one antenna panel, to provide beam reporting information according to one of a plurality of beam reporting formats; and
providing beam reporting information to the base station according to the indicated beam reporting format,
wherein the beam reporting information is for use in determining user equipment positioning and user equipment orientation,
wherein the indicated beam format is determined based on a position accuracy requirement,
wherein the beam reporting format comprises coarse-level, full-level and differential-level reporting formats,
wherein the method further comprises:
receiving the indication from the base station in downlink control information associated with a medium access control, MAC, control element;
receiving an indication to activate or deactivate one or more of the at least one antenna panels in downlink control information associated with a medium access control, MAC, control element.

* * * * *